(12) United States Patent
Sayyed et al.

(10) Patent No.: US 12,380,216 B2
(45) Date of Patent: Aug. 5, 2025

(54) SECURELY CLOSING SYSTEM VULNERABILITY WINDOW AFTER EXTENDED DOWN TIME

(71) Applicant: Dell Products L.P., Round Rock, TX (US)

(72) Inventors: Ibrahim Sayyed, Georgetown, TX (US); Venkata Rama Krishna Rao Atta, Hyderabad (IN); Adolfo S. Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 89 days.

(21) Appl. No.: 18/364,495

(22) Filed: Aug. 3, 2023

(65) Prior Publication Data

US 2025/0045405 A1    Feb. 6, 2025

(51) Int. Cl.
*G06F 21/57* (2013.01)
(52) U.S. Cl.
CPC .................. *G06F 21/575* (2013.01)
(58) Field of Classification Search
CPC .............. G06F 21/575; G06F 21/577
See application file for complete search history.

(56) References Cited

U.S. PATENT DOCUMENTS

| | | | |
|---|---|---|---|
| 7,424,706 B2* | 9/2008 | Ivanov | G06F 8/65 713/180 |
| 10,140,454 B1* | 11/2018 | Spath | G06F 21/577 |
| 2007/0044153 A1* | 2/2007 | Schuba | G06F 21/55 713/188 |
| 2009/0038015 A1* | 2/2009 | Diamant | H04L 63/1433 726/25 |
| 2018/0075238 A1* | 3/2018 | Ferrie | G06F 21/6218 |
| 2023/0069485 A1* | 3/2023 | Huruli | G06F 8/63 |
| 2024/0205702 A1* | 6/2024 | Conyers | H04L 43/0805 |

\* cited by examiner

*Primary Examiner* — Raymond N Phan
(74) *Attorney, Agent, or Firm* — Jackson Walker L.L.P.

(57) ABSTRACT

Disclosed systems and methods address escalated vulnerability attributable to system down time. In at least one embodiment, a customer-selectable threshold of detection establishes the number of days a system is allowed to be "down" before forcing a secured update path as described herein. The threshold may represent a compromise and balance between inconvenience and security based on each customer's preference. Tracking of system down time or offline time may be managed via EC/SBIOS and a real time clock (RTC) timer. The system down time may then be compared to the customer setting, e.g., whenever the system is booted.

20 Claims, 3 Drawing Sheets

SECURELY CLOSING SYSTEM VULNERABILITY WINDOW AFTER EXTENDED DOWN TIME

TECHNICAL FIELD

The present disclosure pertains to information handling systems and, more specifically, managing systems updates to address known vulnerabilities.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Continuous updates to Basic Input/Output System (BIOS)/Embedded Control (EC) firmware (FW), operating system (OS) stacks, and any other system FW are now a well-established features for quickly addressing any system vulnerability findings. As security-minded original equipment manufacturers (OEMs) such as Dell Technologies, close out security gaps and holes, malware experts continue searching for new areas of attack and new vulnerabilities.

Systems are ideally updated immediately after any vulnerability finding results in a fix, typically via a FW/software (SW) update, to close the door on the vulnerability weakness. This generally also applies to hardware (HW) vulnerabilities having a FW/SW workaround. Having a near zero delay between vulnerability finding and applying a patch/fix mitigates against the "zero-day" type vulnerabilities. While near zero delay may be feasible for systems that are always online and constantly monitored/managed by a corporate information technology (IT) framework, zero delay may be challenging or impracticable for systems that experience significant periods of being offline, e.g., in an S4/S5 power state, or being without connectivity.

SUMMARY

In a hypothetical deployment in which a new vulnerability is discovered each day, over the multiple stacks within a computer system, IT managed systems are receiving daily updates as the vulnerabilities are mitigated through new FW/SW stack deployment. In this illustrative scenario a system being off/offline for a week would accumulate seven vulnerabilities to patch when it is next booted, a system that goes off/offline for a month would have 28-31 accumulated vulnerabilities to patch upon boot, and a system down for three months, e.g., summer leave, parental leave, ocean shipping, would have more than 80 accumulated vulnerabilities to patch upon boot. The higher the number of vulnerabilities to patch, the longer it takes and consequently the longer the opportunity window for the malware actor to take over the system.

Compounding the problem, rootkits that operate at a low FW level and hide their presence from antivirus software and other security tools are difficult to detect and remove. Once installed, rootkits can gain control over the boot process and load before the OS. Rootkits can also modify the boot process to load other malware or give an attacker remote access to the compromised system. Thus, the update process needs to prevent rootkits from blocking or otherwise interfering with the boot process. In addition, the opportunity window to install rootkits must be entirely or substantially eliminated.

Subject matter disclosed herein addresses escalated vulnerability attributable to system down time. In at least one embodiment, a customer-selectable threshold of detection establishes the number of days a system is allowed to be "down" before forcing a secured update path as described herein. The threshold may represent a compromise and balance between inconvenience and security based on each customer's preference. Tracking of system down time or offline time may be managed via EC/SBIOS and a real time clock (RTC) timer. The system down time may then be compared to the customer setting, e.g., whenever the system is booted.

As suggested above, embodiments may implement a secure update boot path that will be taken when the system downtime threshold trigger has been activated. The secure update boot path may provide a "safe boot" environment with limited networking stacks focused solely on the purpose of updating all critical system components with the latest FW/SW stack versions (BIOS/EC, OS applications, OS drivers, other FW components in the system, etc.).

The secure update boot path may be prohibited from executing during regular Microsoft or Linux OS update processes, since this may open the window for attack during the time the OS updates are being applied. The "safe boot" path embodiments include, as examples (1) booting into PODS, (2) booting into Excalibur/BIOSconnect, or (3) even booting into a modified version of Windows safe-mode boot with a limited set of active drivers only after the drivers have been checked by the SBIOS to be trusted (e.g., hash check of latest version). In this mode, some embodiments emphasize keeping only the minimal stacks required to perform all the necessary FW/SW updates, as opposed to running a full set of OS stacks during a normal Windows boot, which exposes a much larger domain of multi-tasking stacks that could be vulnerable to attack if not yet updated.

Another embodiment features a "prefetch" method, in which the custom BIOS boot path has the sole task of pulling all of the needed updates and temporally caching them for the normal MSFT/Linux OS update path to apply all the updates, however in a modified state of removed network connectivity (i.e., offline in both wired and wireless) until all patches/updates have been applied. Only then will connectivity be restored after rebooting with all updates applied. This approach avoids duplication of code for tricky parts of the OS update process that MSFT/Linux have already solved, and at the same time closes the malware opportunity window by removing connectivity during the OS update process.

Some embodiments update the EC and SBIOS first, before anything else, via ensuring that key components of this flow reside within the measured area of the EC root of trust checks, thus ensuring that rootkit changes are not present in EC/SBIOS before collecting and applying all the necessary system updates through a secured connection.

Thus, disclosed systems and methods enable and support tracking of system down time and making use of that information to trigger a new "safe boot" update method based on customer preference in setting a threshold value. The alternate BIOS boot path with restricted connectivity may be solely for the purpose of collecting all necessary system updates securely from a trusted connection. Application of the updates may be under a secured environment, e.g., (A) under an alternate boot path with OEM provided update stacks in secured boot path environment, or (B) under modified OS boot "safe boot" path removing connectivity until after all locally cached FW/SW updates have been applied. Disclosed systems close the malware injection opportunity window present during current art of OS application of system updates when the number of updates is large and therefore time consuming (e.g. similar to a "race condition").

Accordingly, in at least one aspect, disclosed systems and method for ensuring security updates include an EC to determine a down time of the information handling system, wherein the down time indicates a time interval since a most recent power off event. Upon determining the down time exceeds a down time threshold, security update operations are performed. The security update operations include booting into a safe OS boot environment, and invoking a preboot network communication resource to download an application patch manifest including resources indicative of one or more security patches. The application patch manifest may include universal resource locators (URLs) for at least some of the one or more security patches and HTTPS certificates for at least some of the URLs. The one or more security patches may then be applied to the applicable security applications before rebooting the information handling system to a normal OS.

The application patch manifest may include hash values corresponding to each of the one or more security patches and the security operations may include validating each of the security patches in accordance with the applicable hash value. In at least some embodiments, the application patch manifest is published to an Advanced Configuration and Power Interface (ACPI) table. In such embodiments, the system may be booted to a safe OS mode without network connections before reading the application patch manifest from the ACPI table.

In at least some embodiments, the security update operations described above may be forcibly executed, i.e., executed without regard to the actual down time of the system, via input from an IT administrator. For example, an IT administrator may set a set OS boot configuration using an out of band management engine such as the Management Engine (ME) interface from Intel.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
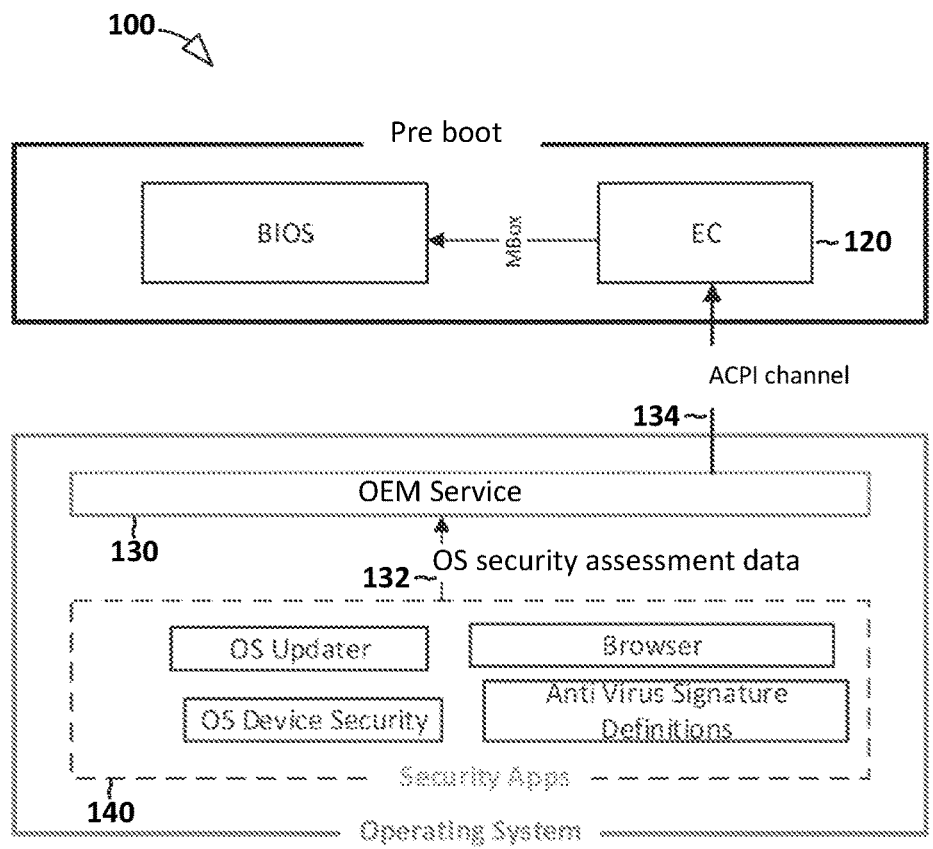
FIG. 1 illustrates a block diagram depicting aspects of a conventional boot flow.

Exemplary embodiments and their advantages are best understood by reference to FIGS. 1-5, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates components and processes for a conventional boot flow in an exemplary information handling system 100. During each power on/boot cycle, an OEM service 130, e.g., an SW SVC from Dell Technologies, collects OS security assessment data 132 including version information for critical security apps 140, corresponding security patches, and device security level information. OS security assessment data 132 can be in coded format to minimize the size.

OEM service 130 may pass OS security assessment data 132 to EC 120 over an ACPI channel 134 during every boot, or whenever security apps 140 are updated. EC 120 may use this information when evaluating the platform boot mode when a platform is powered on after a long storage time, which may be a user-defined threshold parameter (e.g., number of days).

Figure 2:
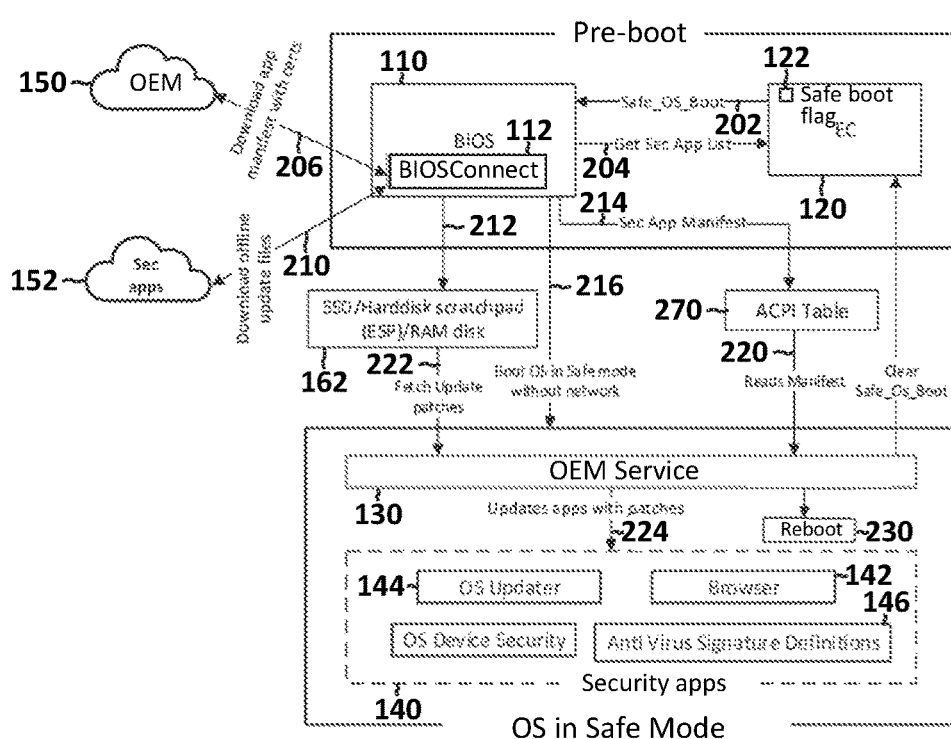
FIG. 2 illustrates a method for booting to a safe mode for vulnerability updates following a long system down time.

Referring now to FIG. 2, components and methods of an information handling system 200 for booting to a safe mode after extended down time are illustrated. Generally, EC 120 determines the device storage period, also referred to herein more simply as off time or down time, i.e., the amount of time since the most recent power off. If the down time exceeds a user-configured or IT imposed threshold time, EC 120 boots (202) BIOS 110 into Safe_OS_Boot. In Safe_OS_Boot, BIOS 110 retrieves (204) the security assessment data 132 report from EC 120. BIOS 110 invokes BIOSconnect 112, a preboot network communication resource, to download (206) an application patch manifest from OEM back end 150. The downloaded manifest may include URLs to download patches, patch hashes for validation, and one or more HTTPS certificates. BIOSConnect 112 may include security controls to ensure data integrity, authenticity, and required security aspects.

As depicted in FIG. 2, BIOSConnect 112 may download (210) required patches from one or more cloud end points 152 for one or more application providers. BIOSConnect 112 may then validate each patch and store (212) validated patches into a scratch region 162 of a suitable storage resource (e.g., hard disk/SSD/RAM). BIOS 110 may then publish (214) the application patch manifest, including the hash values, to ACPI table 270.

FIG. 2 further depicts BIOS 110 booting (216) the operating system into Safe Mode without networking capability. Alternatively, EC 120 may turn off all network interfaces and boot to OS normally. As depicted in FIG. 2, OEM service 130 reads (220) the manifest data, if available, from ACPI table 270, and fetches (222) the update patches from scratch region 162. OEM service 130 may then validate and apply (224) validated patches to security apps 140, e.g., a browser 142, an OS updater 144, antivirus signature definitions 146, etc.

After applying patches, OEM service 130 may clear a Safe_OS_Boot flag 122 in EC 120 so that the next system reset triggers a normal boot. OEM service 130 may then reboot (230) the system, which will now boot to OS normally after all security updates have completed.

Figure 3:
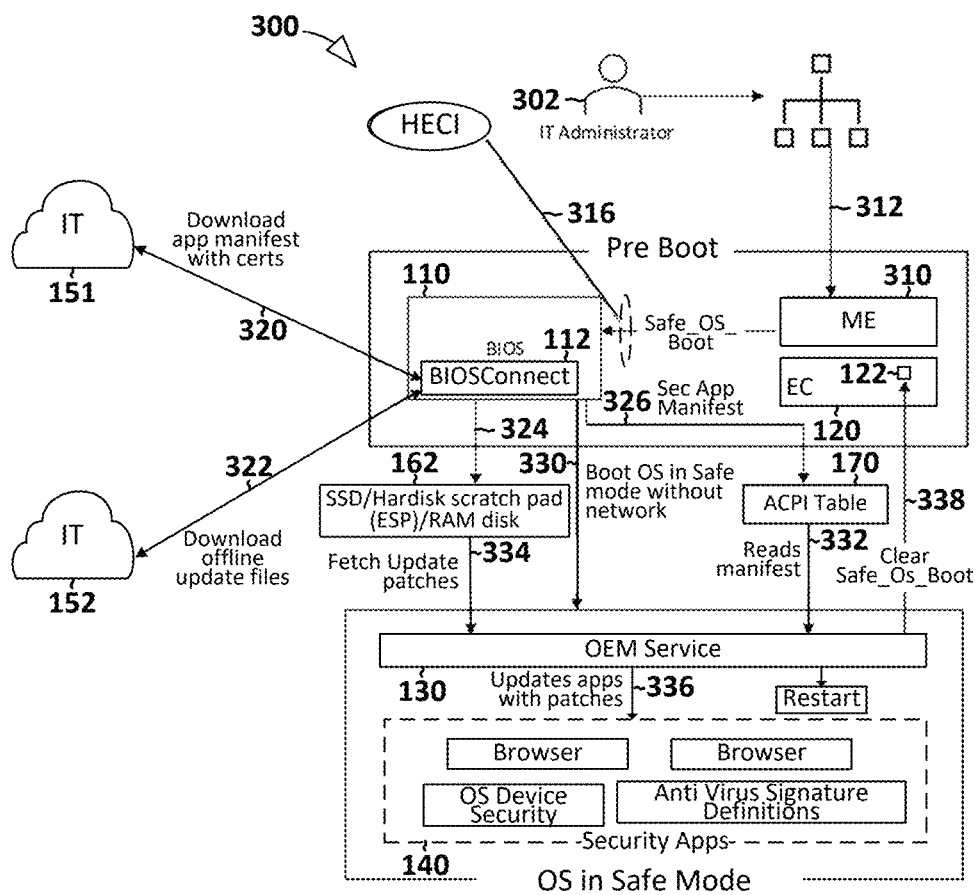
FIG. 3 illustrates a method in which an IT administrator boots to a safe mode for vulnerability updates following a long system down time.

Referring now to FIG. 3, components and systems of information handling system 300 suitable for use with a use case in which, rather than relying on a down time criterion to initiate security updates, an IT administrator forces the system to perform security updates, are illustrated. This use case can be desirable, as an example, to force virus definition updates for critical threats like ransomware.

As depicted in FIG. 3, an IT administrator 302 uses an out of band management interface, such as the Intel ME 310, to configure (312) the system with Safe_OS_Boot. BIOS 110 may then make a host embedded controller interface (HECI) call (316) to ME 310 to determine whether Safe_OS_Boot is needed. If needed, BIOSConnect 112 is triggered instead of booting to OS. In response, BIOSConnect 112 downloads (320) the app manifest from IT enterprise backend 151. The downloaded app manifest may include URLs to download patches, patch hashes to validate, and HTTPS certificates. Again, as in FIG. 2, BIOSConnect 112 security controls ensure data integrity, authenticity and required security aspects.

FIG. 3 further depicts BIOSConnect 112 downloading (322) required patches from respective app provider's cloud end points 152. BIOSConnect 112 may then validate and store (324) downloaded patches into storage resource scratch region 162. BIOS 110 may then publish (326) the app patch manifest, including hash values, to ACPI table 170.

As depicted in FIG. 3, BIOS 110 boots (330) the operating system into Safe Mode without networking capability. Alternatively, EC 120 can turn off all network interfaces and Boots to OS normally. The OEM service 130 checks and reads (332) the manifest data from ACPI 170 if available before fetching (334) the update patches from scratch region 162 and validates the integrity of the patches.

OEM service 130 may then apply (336) the patches to security apps 140. OEM service 130 may apply patches on OEM applications, whereas for non-OEM stacks, updates may be handed off to an existing update service (not depicted in FIG. 3).

After applying patches, OEM service 130 clears (338) a Safe_OS_Boot flag 122 in EC 120 to enforce normal boot at next boot. OEM service 130 reboots the system and the system boots to OS normally after all security updates have been applied.

Figure 4:
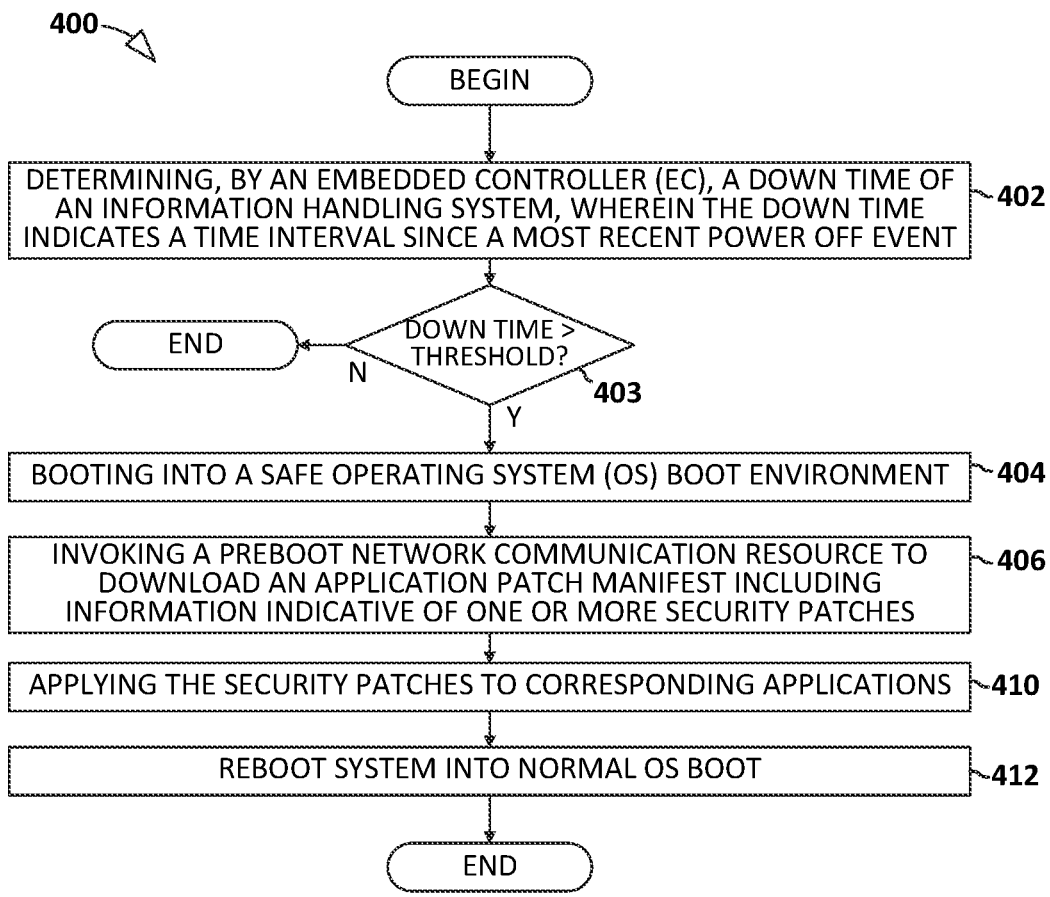
FIG. 4 illustrates a flow diagram of a method for ensuring sufficiently frequent security updates in accordance with disclosed subject matter.

Referring now to FIG. 4, a flow diagram of a method 400 for triggering firmware updates in a system that experiences appreciable down time based, at least in part, on the interval of time that has elapsed since the system's last power off or cold reset event. The illustrated method 400 includes determining (402), by an EC within an information handling system, a down time of the system. In at least some embodiments, the down time refers to a time interval that has passed since a most recent power off or cold reset of the system. As depicted in FIG. 4, method 400 further includes determining (403) whether the down time exceeds a configurable down time threshold. If the down time exceeds the threshold, the system is booted (404) into a safe OS boot and (406) a preboot network communication resource, such as a BIOSConnect resource from Dell Technologies, is invoked (406) to download an application patch manifest that includes information indicative of one or more security patches. The manifest information may include one or more URLs for downloading corresponding security patches and one or more hash values to authenticate the security patches. Each downloaded and authenticated security patch may then be applied (410) to the corresponding security application. After applying the security patches, the system may be rebooted (412) via a normal or primary OS environment. In some cases, the EC may include or control a safe OS flag or configuration setting that can be set to force a safe OS boot. In such embodiments, the EC may clear the safe OS flag before rebooting the system.

Figure 5:
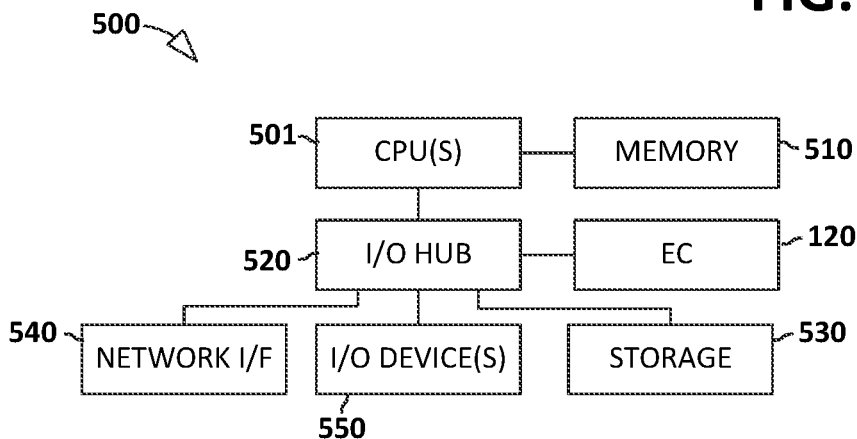
FIG. 5 illustrates an exemplary information handling system suitable for use as or in conjunction with elements disclosed in FIGS. 1-4.

Referring now to FIG. 5, any one or more of the elements illustrated in FIG. 1 through FIG. 4 may be implemented as or within an information handling system exemplified by the information handling system 500 illustrated in FIG. 5. The illustrated information handling system includes one or more general purpose processors or central processing units (CPUs) 501 communicatively coupled to a memory resource 510 and to an input/output hub 520 to which various I/O resources and/or components are communicatively coupled. The I/O resources explicitly depicted in FIG. 5 include a network interface 540, commonly referred to as a NIC (network interface card), storage resources 530, and additional I/O devices, components, or resources 550 including as non-limiting examples, keyboards, mice, displays, printers, speakers, microphones, etc. The illustrated information handling system 500 includes an embedded controller EC 120 may provide or support various system management functions and, in at least some implementations, keyboard controller functions. Exemplary system management function that may be supported by EC 120 include thermal management functions supported by pulse width modulation (PWM) interfaces suitable for controlling system fans, power monitoring functions support by an analog-to-digital (ADC) signal that can be used to monitor voltages and, in conjunction with sense resistor, current consumption per power rail. This information could be used to, among other things, monitor battery charging or inform the user or administrator of potentially problematic power supply conditions. EC 120 may support battery management features to control charging of the battery in addition to switching between the battery and AC adapter as the active power source changes or monitoring the various battery status metrics such as temperature, charge level and overall health. EC 120 may support an Advanced Configuration and Power Interface (ACPI) compliant OS by providing status and notifications regarding power management events and by generating wake events to bring the system out of low power states.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for ensuring security updates, the method comprising:
   determining, by an embedded controller (EC) of an information handling system, a down time of the information handling system, wherein the down time is indicative of a time interval since a most recent power off event;
   responsive to determining the down time exceeds a down time threshold, performing security update operations including:
   booting into a safe operating system (OS) boot environment;
   invoking a preboot network communication resource to download an application patch manifest including resources indicative of one or more security patches;
   applying the one or more security patches to corresponding applications; and
   rebooting the information handling system to an OS.

2. The method of claim 1, wherein the application patch manifest includes hash values corresponding to each of the one or more security patches and wherein the security operations include validating each of the one or more security patches in accordance with the hash values.

3. The method of claim 1, wherein the application patch manifest further includes:
   universal resource locators (URLs) for at least some of the one or more security patches; and
   HTTPS certificates for at least some of the URLs.

4. The method of claim 1, further comprising publishing the application patch manifest to an Advanced Configuration and Power Interface (ACPI) table.

5. The method of claim 1, wherein the one or more security applications include a browser application.

6. The method of claim 1, further comprising, prior to rebooting the information handling system, clearing a safe boot flag in the EC.

7. The method of claim 1, further comprising:
responsive to determining the down time does not exceed the down time threshold, performing the security operations in response to administrator input asserting a safe OS boot configuration setting.

8. The method of claim 4, further comprising reading the application patch manifest from the ACPI table.

9. The method of claim 7, wherein the administrator input comprises administrator input provided via an out of band management engine.

10. The method of claim 8, further comprising booting an OS in a safe mode without network communications prior to reading the application patch manifest.

11. An information handling system, comprising:
a central processing unit (CPU);
an embedded controller (EC) communicatively coupled to the CPU; and
a computer readable medium including processor executed instructions that, when executed by a processor, cause the information handling system to perform operations including:
determining, by the EC, a down time of the information handling system, wherein the down time is indicative of a time interval since a most recent power off event; and
responsive to determining the down time exceeds a down time threshold, performing security update operations including:
booting into a safe operating system (OS) boot environment;
invoking a preboot network communication resource to download an application patch manifest including resources indicative of one or more security patches;
applying the one or more security patches to corresponding applications; and
rebooting the information handling system to an OS.

12. The information handling system of claim 11, wherein the application patch manifest includes hash values corresponding to each of the one or more security patches and wherein the security operations include validating each of the one or more security patches in accordance with the hash values.

13. The information handling system of claim 11, wherein the application patch manifest further includes:
universal resource locators (URLs) for at least some of the one or more security patches; and
HTTPS certificates for at least some of the URLs.

14. The information handling system of claim 11, further comprising publishing the application patch manifest to an Advanced Configuration and Power Interface (ACPI) table.

15. The information handling system of claim 11, wherein the one or more security applications include a browser application.

16. The information handling system of claim 11, further comprising, prior to rebooting the information handling system, clearing a safe boot flag in the EC.

17. The information handling system of claim 11, further comprising:
responsive to determining the down time does not exceed the down time threshold, performing the security operations in response to administrator input asserting a safe OS boot configuration setting.

18. The information handling system of claim 14, further comprising reading the application patch manifest from the ACPI table.

19. The information handling system of claim 17, wherein the administrator input comprises administrator input provided via an out of band management engine.

20. The information handling system of claim 18, further comprising booting an OS in a safe mode without network communications prior to reading the application patch manifest.

* * * * *